T. A. MORRIS.
Quartz Crusher.
No. 44,013.
Patented Aug. 30, 1864.
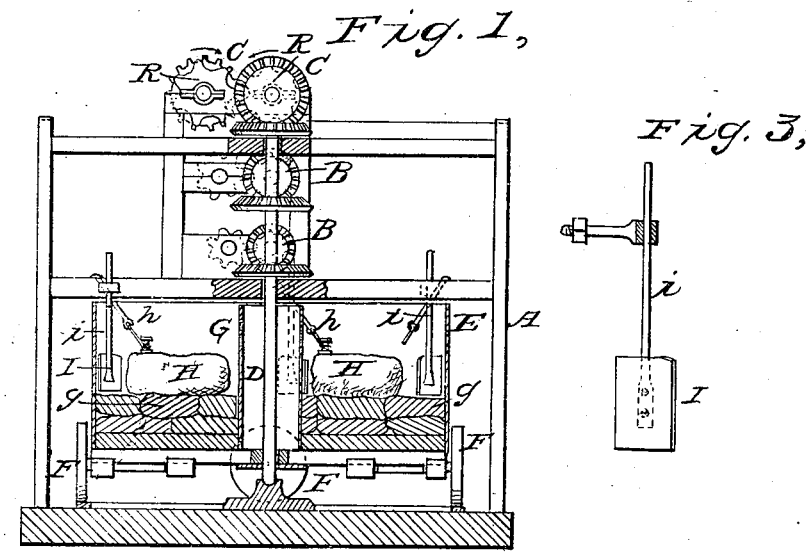
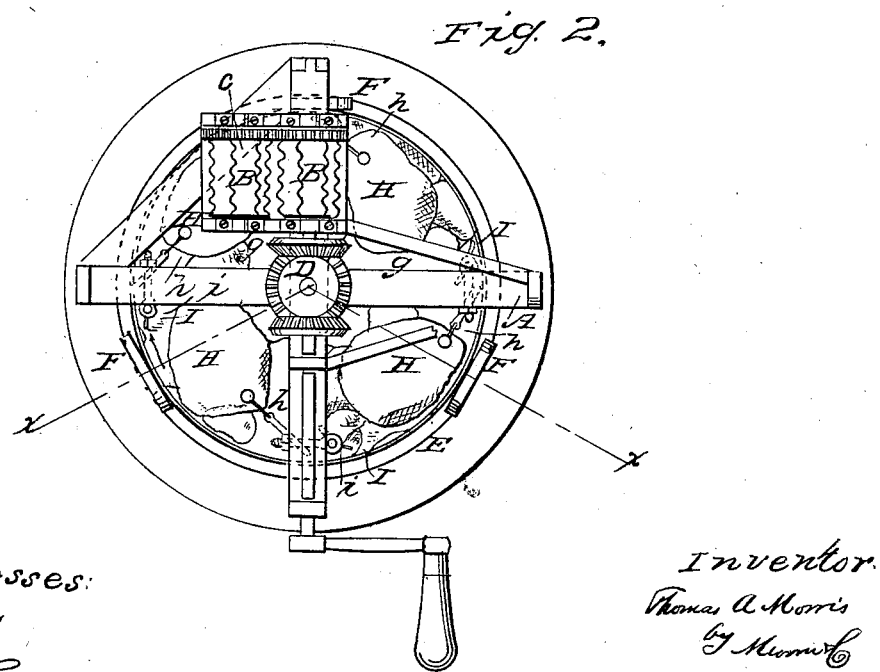

UNITED STATES PATENT OFFICE.

THOMAS A. MORRIS, OF GREEN BAY, WISCONSIN, ASSIGNOR TO HIMSELF AND F. R. SCHETTLER.

IMPROVEMENT IN QUARTZ-CRUSHERS.

Specification forming part of Letters Patent No. 44,013, dated August 30, 1864; antedated March 6, 1864.

*To all whom it may concern:*

Be it known that I, THOMAS A. MORRIS, of Green Bay, in the county of Brown and State of Wisconsin, have invented a new and useful Improvement in Quartz Crushers; and I do hereby declare that the following is a full, clear, and exact description of the same, reference being had to the annexed drawings, making a part of this specification, in which—

Figure 1 is a vertical section of a quartz-crusher taken in the line $x\,x$ of Fig. 2, and having my improvement attached to it; Fig. 2, a plan or top view of the same, and Fig. 3 a detached view of my invention.

Similar letters of reference indicate corresponding parts in the several figures.

This invention relates to an improvement on a quartz-crushing machine for which Letters Patent were granted to myself and F. R. Schettler, bearing date October 23, 1860. This patented machine consists, substantially, of crushing-rollers and a rotating bed of flat rocks, on which one or more drags rest, the rocks being placed in a suitable cylinder, into which the crushed quartz, water, and quicksilver are placed. This machine operates remarkably well, with the exception that the quartz in the cylinder is liable, owing to centrifugal force generated by the rotation of the cylinder, to be thrown against the side thereof, and thereby escape a proper action of the drags.

To obviate this difficulty is the object of this invention; and to this end I employ a series of scrapers, one for each drag, and attach these scrapers to the frame of the machine so that they will be stationary at the inner side of the cylinder, and as the latter rotates scrape the quartz therefrom and cast it toward the center of the cylinder.

To enable those skilled in the art to fully understand and construct my invention, I will proceed to describe it.

A represents a framing having one or more pairs of crushing-rollers, B, at its upper part driven by gearing C; and D is a vertical shaft which has a cylinder, E, placed on or attached to it, said cylinder being mounted on wheels F, which are placed on an annular way, $e$, on the base $f$ of the framing A.

G is a tube or pipe, which is fitted in the cylinder E, concentric with shaft D, and open at both ends, and the bottom of the cylinder E is covered with pieces $g$ of quartz rock firmly embedded in any suitable cement.

H represents blocks of quartz-rock which rest on the bottom of cylinder E, and are connected by ropes or chains $h$ to the framing A.

The parts above described are precisely like those described in my patented machine previously alluded to, and the operation of the machine is precisely the same so far as the crushing action is concerned.

I represents scrapers which are of shovel or scoop form. These scrapers are attached to rods $i$, which are secured to the framing A, and the scrapers are at the inner side of the cylinder E, one being in front of each block H, and having an oblique position, as shown clearly in Fig. 2. These scrapers thus arranged prevent the quartz collecting around the outer part of the cylinder, as they throw the quartz inward toward the center and counteract the centrifugal force generated by the rotation of the cylinder. The scrapers, therefore, perform an important feature, as they insure every portion of the quartz being thoroughly acted upon.

I do not claim the rotating quartz-bed, nor the stationary quartz-drags, for they have been previously used and may be seen in the machine formerly patented by me and previously referred to; but I do claim as new and desire to secure by Letters Patent—

The employment or use of the scrapers I when used in connection with the rotating cylinder E, provided with the quartz-bed $g$ and the stationary drags H, all arranged for joint operation, substantially as and for the purpose set forth.

THOS. A. MORRIS.

Witnesses:
W. C. E. THOMAS,
CHAS. R. LAKE.